United States Patent
Kino

(10) Patent No.: US 7,906,247 B2
(45) Date of Patent: Mar. 15, 2011

(54) FUEL CELL AND FRAME USED THEREIN

(75) Inventor: Yoshitaka Kino, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 736 days.

(21) Appl. No.: 11/510,611

(22) Filed: Aug. 28, 2006

(65) Prior Publication Data

US 2007/0048585 A1    Mar. 1, 2007

(30) Foreign Application Priority Data

Aug. 29, 2005    (JP) ................................. 2005-247917

(51) Int. Cl.
*H01M 2/08*    (2006.01)
*H01M 4/64*    (2006.01)

(52) U.S. Cl. ........................................ 429/508; 429/517

(58) Field of Classification Search ..................... 429/34
See application file for complete search history.

(56) References Cited

U.S. PATENT DOCUMENTS

| | | | |
|---|---|---|---|
| 6,472,094 B1 * | 10/2002 | Nonoyama et al. | 429/492 |
| 2003/0064272 A1 * | 4/2003 | Inagaki et al. | 429/34 |

FOREIGN PATENT DOCUMENTS

| | | |
|---|---|---|
| JP | A-2003-077499 | 3/2003 |
| JP | A-2003-178776 | 6/2003 |
| JP | A-2003-223903 | 8/2003 |

* cited by examiner

*Primary Examiner* — Dah-Wei D Yuan
*Assistant Examiner* — Stephan Essex
(74) *Attorney, Agent, or Firm* — Kenyon & Kenyon LLP

(57) ABSTRACT

The fuel cell of the present invention includes: a MEA (membrane-electrode assembly); resin frames which are deposited at the front and the rear surface of the MEA and which sandwich the peripheral edge portion of the MEA and fix it; and electrically conductive separators, which are disposed on the front and the rear surfaces of the MEA which is sandwich and fixed by the resin frames, which contact against the MEA, and on which collector portions are formed which collect electricity from the MEA; and these resin frames sandwich and fix a portion of the peripheral edge portion of the MEA, while, on the electrically conductive separators, there formed collector portions at another peripheral edge portion of the MEA which is not sandwiched by the resin frames.

8 Claims, 11 Drawing Sheets

FUEL CELL AND FRAME USED THEREIN

INCORPORATION BY REFERENCE

The disclosure of Japanese Patent Application No. 2005-247917 filed on Aug. 29, 2005 including the specification, drawings and abstract is incorporated herein by reference in its entirety.

BACKGROUND OF THE INVENTION

1. Field of the Invention

The present invention relates to a solid polymer electrolyte fuel cell (hereinafter simply termed a "fuel cell"), and to a frame which is used therein; and, more particularly, to a fuel cell which incorporates a separator which contacts against an MEA (membrane electrode assembly) which is included in the fuel cell, and to a frame which is used therein.

2. Description of the Related Art

A fuel cell includes an MEA which has electrodes on the surfaces of an electrolyte layer which is made from an ion exchange layer. Such an MEA includes, on its one surface, a fuel electrode (an anode), which is an electrode which reacts with a fuel gas (hydrogen), and, on its other surface, an oxidant electrode (a cathode) which reacts with an oxidant gas (oxygen); and a predetermined chemical reaction takes place upon such an MEA, thus enabling electricity to be extracted.

There is a per se known structure for this kind of fuel cell, as for example disclosed in Japanese Laid-Open Patent Publication 2003-77499, comprising an MEA, resin frames which are disposed on the front and the rear surfaces of the MEA and which sandwich a peripheral edge portion of the MEA and thereby fix it, and separators which are disposed on the front and the rear surfaces of the MEA of which the peripheral edge portion is sandwiched and fixed by the resin frames, and on which collector portions are formed which contact against the MEA.

In the fuel cell having the structure described above, the resin frames sandwich and fix the peripheral edge portion of the MEA. In order for the predetermined chemical reaction to progress in a smooth manner upon the MEA and for electricity to be extracted, it is desirable for the MEA to be held flat, and, for this, with the fuel cell of the above described structure, it is necessary to strive for preventing the occurrence of wrinkling of the MEA, the peripheral edge portion of which is sandwiched and fixed by the resin frames.

With the fuel cell of the above described structure, since the MEA is fixed by its peripheral edge portion being sandwiched by the resin frames, accordingly it is not possible to provide any collector portion at the peripheral edge portion of the MEA. Due to this, there has been the problem that it is not possible to collect any electricity from the peripheral edge portion of the MEA, even though fuel gas and oxidant gas are supplied to this peripheral edge portion of the MEA.

The objective of the present invention is to provide a fuel cell in which the peripheral edge portion of an MEA can be utilized for generating electricity, and a frame which is used therein.

SUMMARY OF THE INVENTION

According to one aspect thereof, the present invention provides a fuel cell, comprising: a membrane electrode assembly which comprises electrodes being formed on the surface of an electrolyte layer; insulating frames which are disposed at the front and the rear surface of the membrane electrode assembly, and which fix the membrane electrode assembly by sandwiching a portion of a peripheral edge portion of the membrane electrode assembly; and electrically conductive separators which are disposed at the front and the rear surface of the membrane electrode assembly, which are formed at other peripheral edge portion of the membrane electrode assembly which are not sandwiched by the insulating frames, and which contact against the membrane electrode assembly and define collector portions which collect electricity from the membrane electrode assembly.

In the above described fuel cell, for example, the electrically conductive separators may have convex portions, and the collector portions at the peripheral edge portion of the membrane electrode assembly may be constituted by the convex portions being contacted against the membrane electrode assembly.

Moreover, in the above described fuel cell, the convex portions, along with defining the collector portions, may define coolant passages which conduct a coolant, oxidant gas supply passages which supply an oxidant gas, and fuel gas supply passages which supply a fuel gas.

The insulating frames may be made from a resin.

The electrically conductive separators may be made from a metal.

Furthermore, according to another aspect thereof, the present invention provides a frame which is used in a fuel cell as described in any of the paragraphs above, comprising a sandwiching portion for sandwiching a peripheral edge portion of the membrane electrode assembly, and in that hole portions are formed so as to admit the collector portions of the electrically conductive separators through the sandwiching portion.

Moreover, according to yet another aspect thereof, the present invention provides a frame which is used in a fuel cell as described in any one of the paragraphs above, comprising a sandwiching portion for sandwiching a peripheral edge portion of the membrane electrode assembly, and in that cutaway portions are formed so as to admit the collector portions of the electrically conductive separators through the sandwiching portion.

With the fuel cell and the frame of the present invention, it is possible to utilize the peripheral edge portion of the MEA for generation of electricity. Accordingly, with the fuel cell and the frame of the present invention, it becomes possible to take advantage of the entire surface of the MEA for the generation of electricity.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following, embodiments of the present invention will be explained in detail with reference to the drawings. First, a fuel cell 10 according to a first embodiment of the present invention will be explained with reference to FIGS. 1 to 7.

Figure 1:
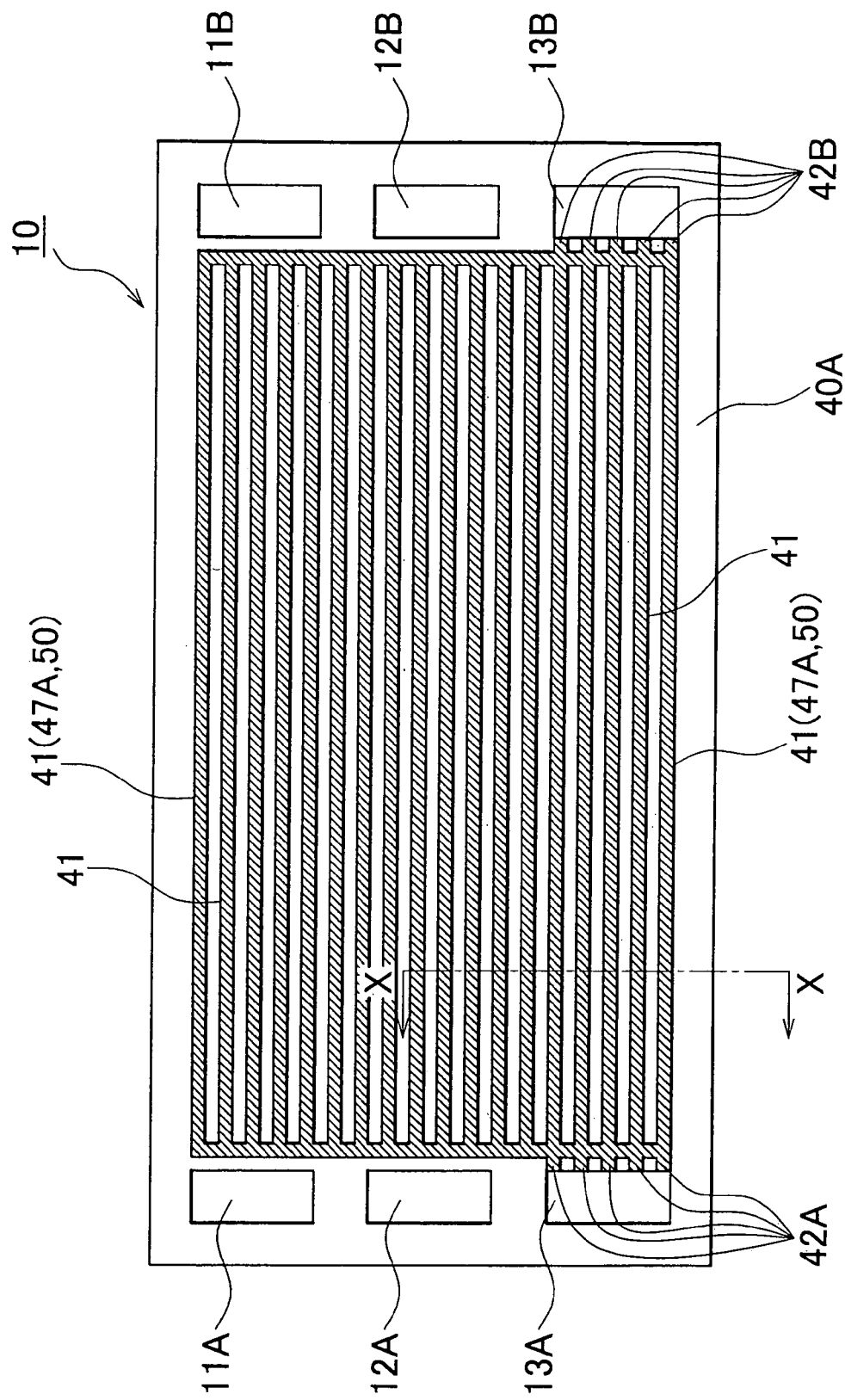
FIG. 1 is a plan view of a fuel cell according to a first embodiment of the present invention.

As shown in FIG. 1, this fuel cell 10 comprises a supply side fuel gas manifold 11A for supplying a fuel gas such as hydrogen or the like into the fuel cell 10, a discharge side fuel gas manifold 11B for discharging fuel gas which has been supplied into the fuel cell 10, a supply side oxidant gas manifold 12A for supplying air (oxygen) into the fuel cell 10, a discharge side oxidant gas manifold 12B for discharging air or the like which has been supplied into the fuel cell 10, a supply side coolant manifold 13A, and a discharge side coolant manifold 13B for discharging coolant which has been supplied into the fuel cell 10.

Figure 2:
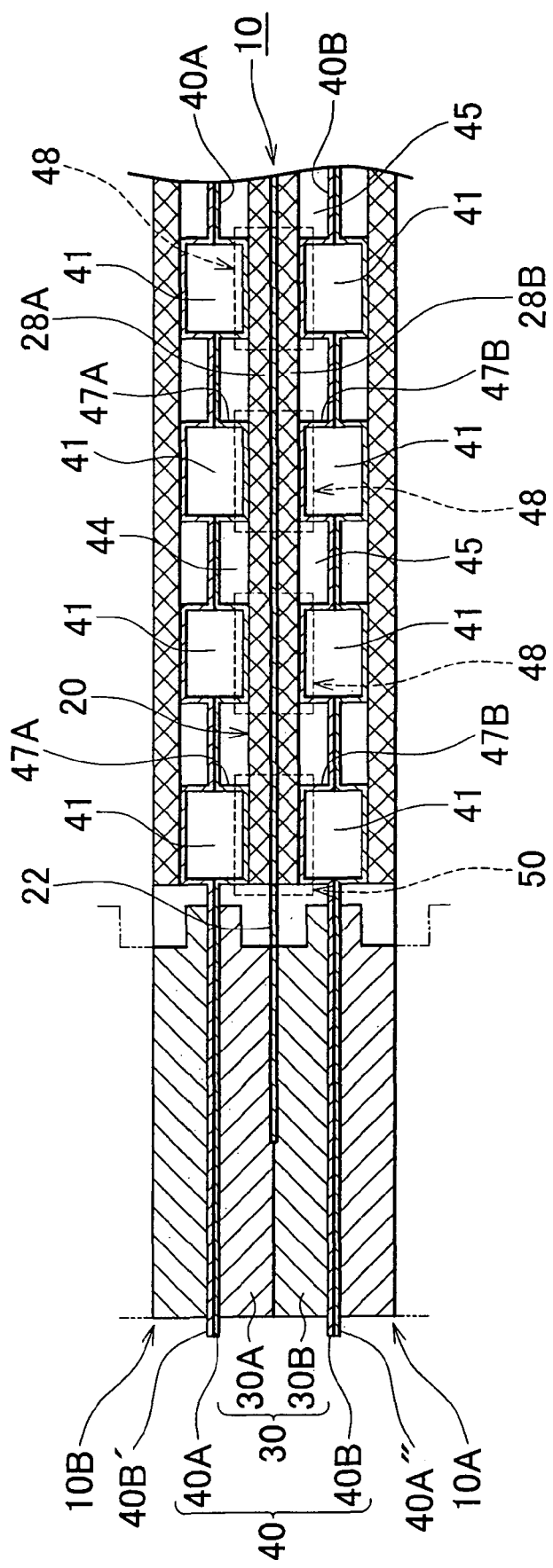
FIG. 2 is a sectional view of a portion of the fuel cell of FIG. 1, taken in a plane shown by the line A-A in that figure.
Figure 3:
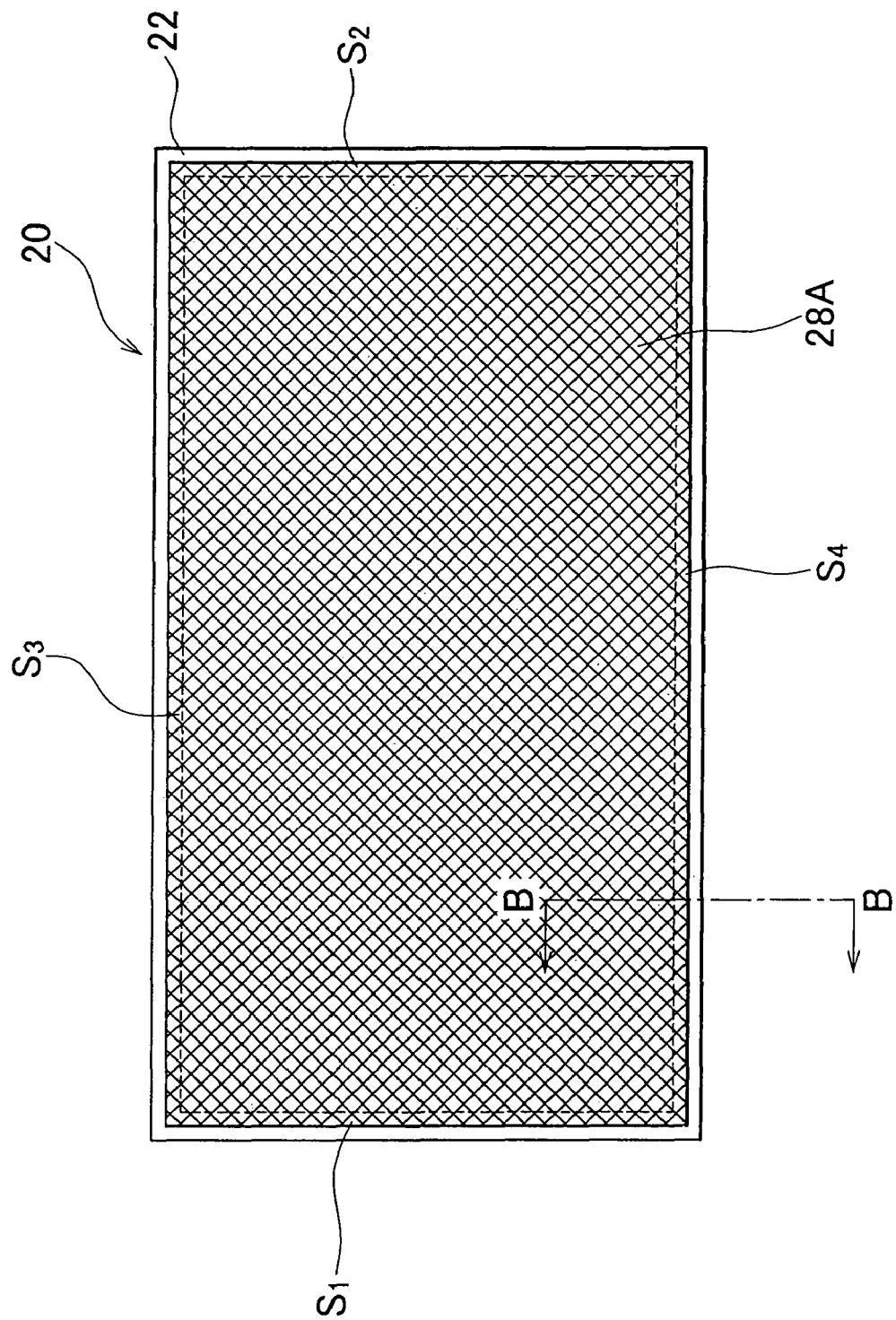
FIG. 3 is a plan view of an MEA.
Figure 4:
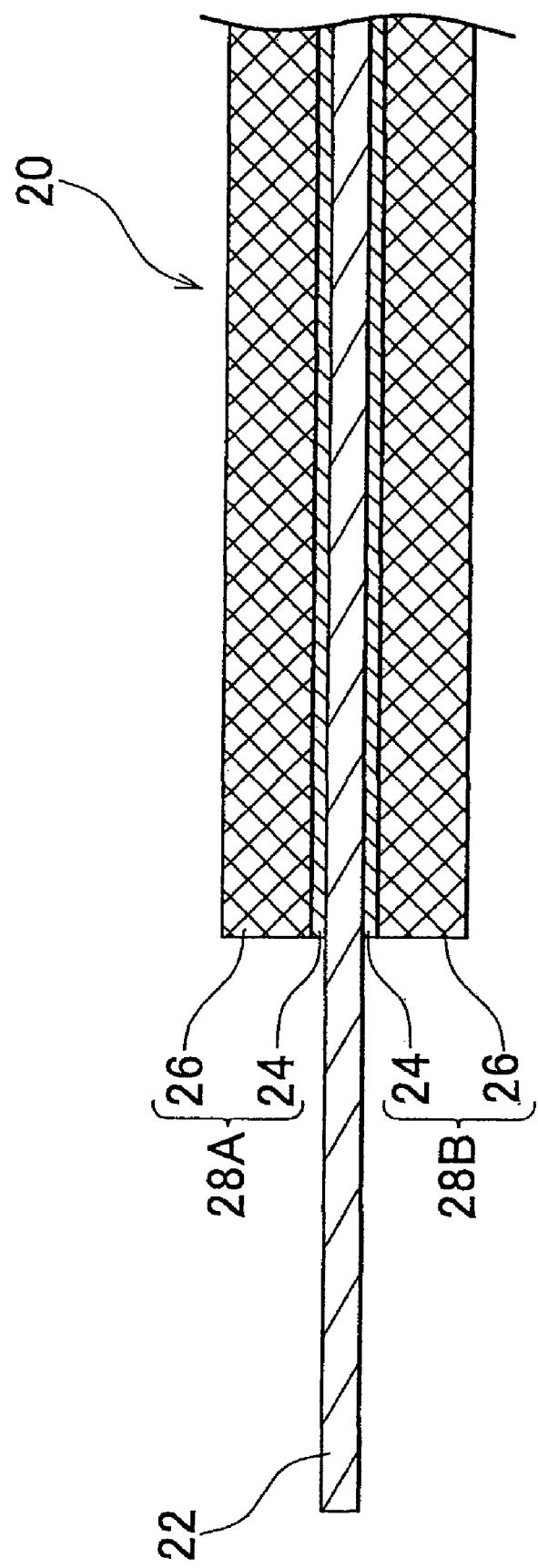
FIG. 4 is a sectional view of a portion of the MEA of FIG. 3, taken in a plane shown by the line B-B in that figure.

As shown in FIG. 2, the fuel cell 10 according to this embodiment comprises an MEA 20, resin frames 30 (30A, 30B) which are disposed on the front and rear surfaces of the MEA 20, and separators 40 (40A, 40B) which are disposed on the front and rear surfaces of the MEA 20 which is sandwiched between the resin frames 30. It should be understood that in FIG. 2, for the convenience of explanation, there are shown only one fuel cell 10 (a single cell of the fuel cell 10) and portions of other fuel cells 10A, 10B at its upper surface and its lower surface, but, also normally, it is supposed that a plurality of other fuel cells will be disposed on both surfaces of the fuel cell 10 according to this embodiment. Moreover, it should be understood that the above described resin frames 30 (30A, 30B) not only may be formed from resin, but may be made from any insulating material.

In this embodiment, the MEA is an electrolyte assembly including electrolyte material and an electrode. This MEA comprises an electrolyte layer 22 and electrodes 28 which include catalyst layers 24 and diffusion layers 26. The electrode 28A which is formed upon one surface of the electrolyte layer 22 is the cathode (the air electrode), while the electrode 28B which is formed upon the other surface thereof is the anode (the fuel electrode).

The electrolyte layer 22 is made from a solid polymer material, and includes an electrolyte base such as a sulfonic acid base or the like, within a polymer chain. This electrolyte layer 22 strongly couples to specified ions, thus having the nature of selectively passing positive ions or negative ions. A fluorine type electrolyte layer such as a per-fluorosulfonic acid layer or the like may be used as this electrolyte layer 22.

The catalyst layers 24 include a catalyst loaded carbon in which a noble metal catalyst such as platinum, gold, palladium, ruthenium, iridium or the like is loaded into carbon, and a resin which adheres this catalyst loaded carbon to the electrolyte layers 22. As for the carbon, this is not particularly limited; oil furnace black, channel black, thermal black, acetylene black or the like may be used.

As the resin which is used in this catalyst layer, it is possible to use a polymer including fluorine atoms such as polyvinyl chloride (PVF), polyvinylidene fluoride (PVDF), poly-hexafluoropropylene (FEP), or the like, or a copolymer of these, or a copolymer of the monomer units of these with another monomer such as ethylene or styrene or the like, or a blend or the like thereof. It should be understood that the resin which is used in the catalyst layer 24 is not to be considered as being only limited to these examples.

A portion of the peripheral edge portion of the MEA 20 is fixed by being sandwiched between the resin frames 30 (30A, 30B). It should be understood that here, by the peripheral edge portion of the MEA 20 is meant, the edge portion of the periphery of the MEA. For example, to explain this using the plan view of the MEA 20 shown in FIG. 3, this is the area designated as the regions $S_1$, $S_2$, $S_3$, and $S_4$. It should be understood that, although the MEA 20 according to this embodiment of the present invention has a structure in which the edge portion of the electrolyte layer 22 protrudes further to the outside than its cathode and its anode, the edge portion of this electrolyte layer 22 is not the peripheral edge portion of the MEA. By the peripheral edge portion of the MEA is meant the region at the absolute periphery of the MEA 20, which comprises the electrolyte layer 22 and the electrodes 28 (the cathode 28A and the anode 28B).

The resin frames 30 which sandwich the MEA 20 consist of a pair of resin frames 30A and 30B, and the resin frame 30A is arranged on the cathode side of the MEA 20, while the resin frame 30B is arranged on the anode side of the MEA 20. It should be understood that these resin frames 30 are made from a per se known kind of resin, like phenol resin or the like.

Figure 5:
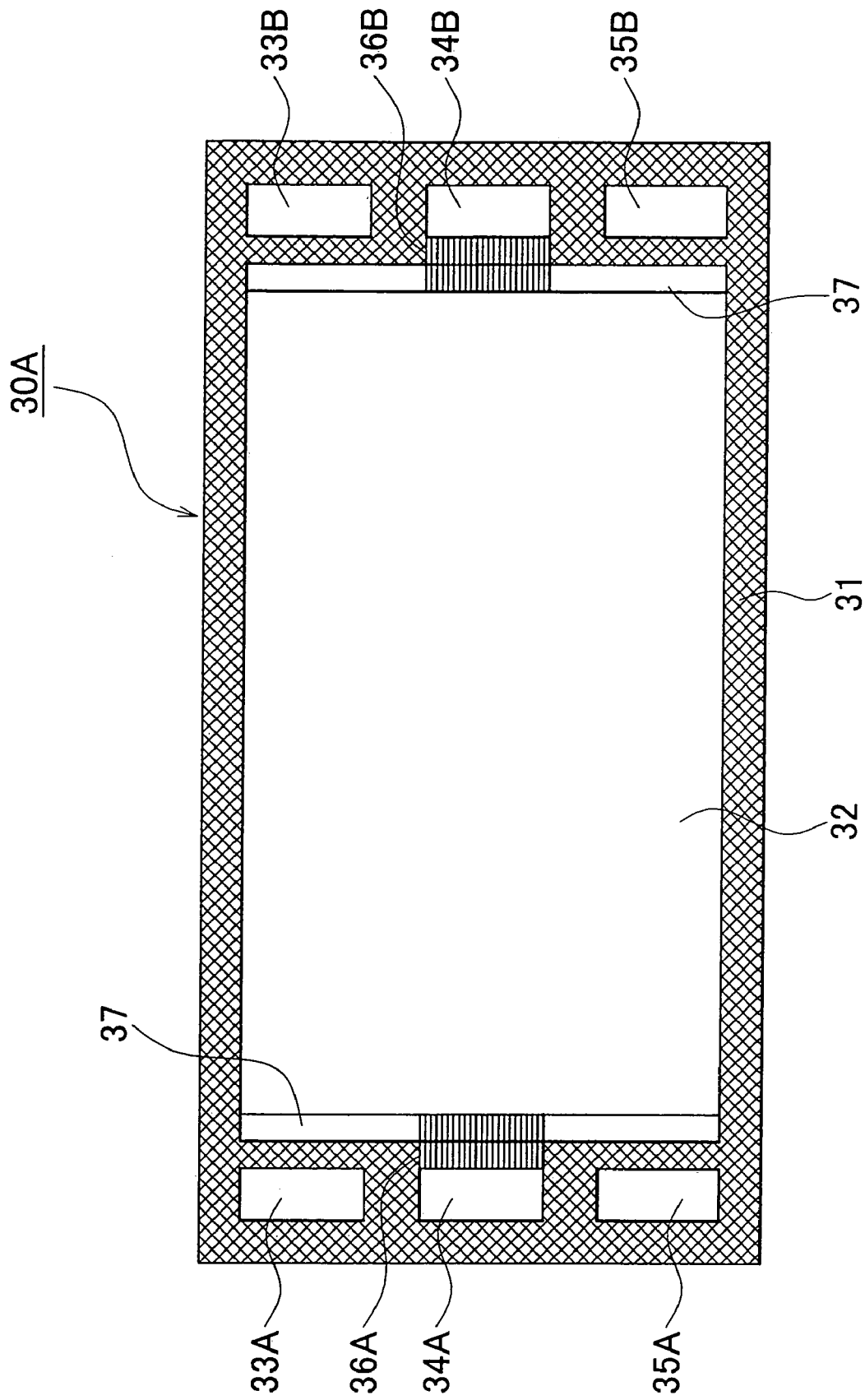
FIG. 5 is a plan view of a resin frame (on the cathode side)

Now, an explanation of these resin frames 30 will be provided by taking the cathode side resin frame 30A as an example. As shown in FIG. 5, this resin frame 30A comprises a frame portion 31, and an opening portion 32 positioned at the inside of this frame portion 31 for arranging the MEA. The frame portion 31 comprises the fuel gas manifolds 33A and 33B, the oxidant gas manifolds 34A and 34B, and the coolant manifolds 35A and 35B on both the supply side and discharge side. In this shown resin frame 30A on the cathode side, in particular, there are comprised an oxidant gas supply path 36A for supplying the air which is supplied via the oxidant gas manifold 34A to the cathode 28A of the MEA 20, and an oxidant gas discharge path 36B for discharging the air which has been supplied to the MEA 20 and the water which has been generated (the generated water) on the discharge side to the oxidant gas manifold 34B. In this embodiment, the oxidant gas supply path 36A and the oxidant gas discharge path 36B each consists of a plurality of grooves.

Figure 6:
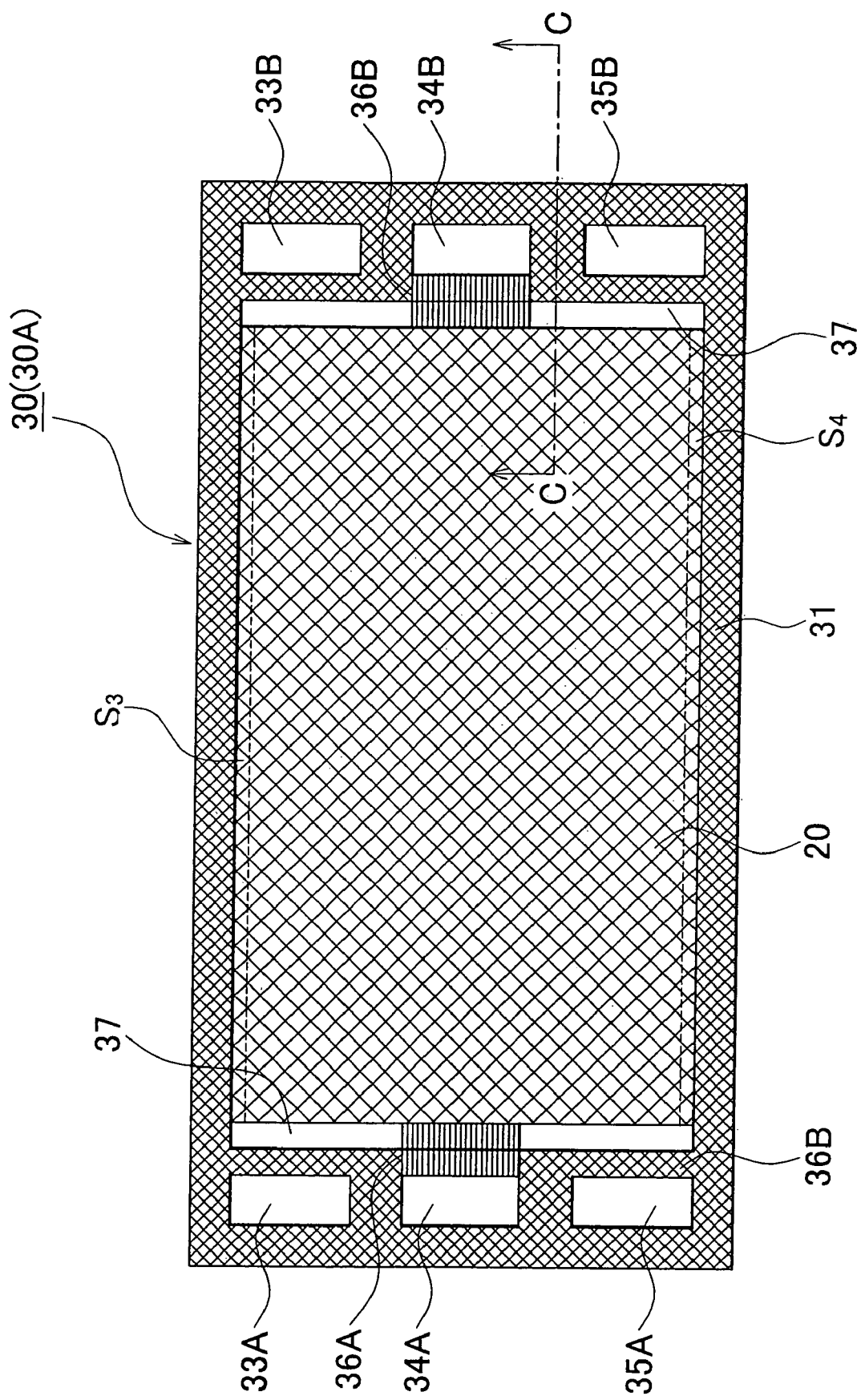
FIG. 6 is a plan view of a resin frame which sandwiches an MEA.
Figure 7:
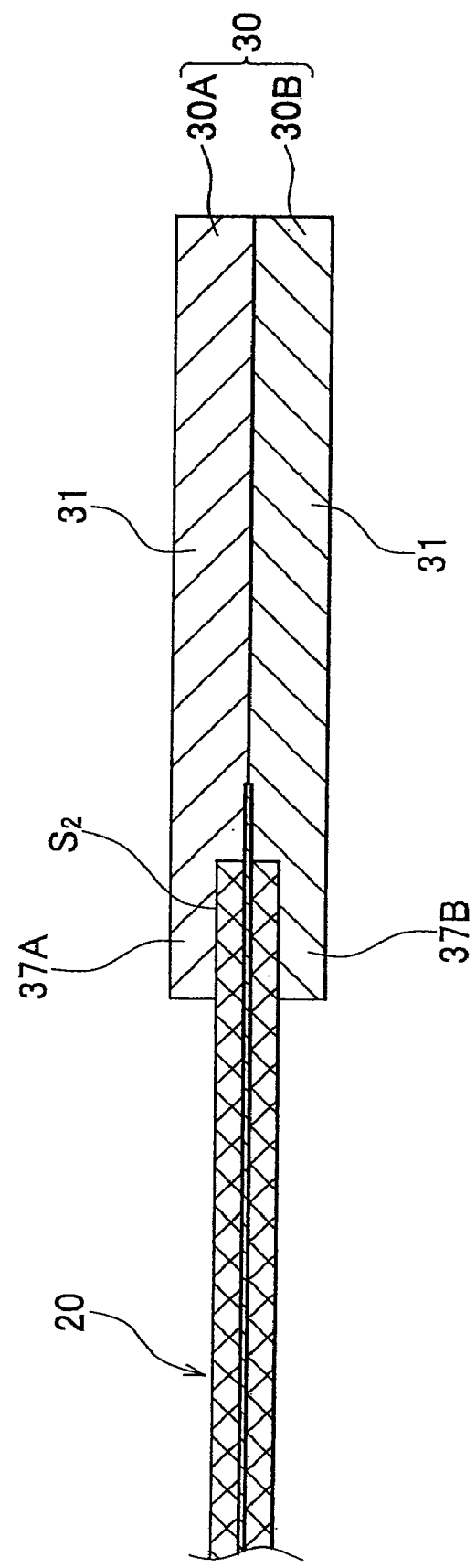
FIG. 7 is a sectional view of a portion of the resin frame sandwiching an MEA shown in FIG. 6, taken in a plane shown by the line C-C in that figure.

As shown in FIG. 6, the resin frame 30A comprises sandwiching portions 37 which sandwich the peripheral edge portion of the MEA 20. These sandwiching portions 37 are positioned at regions in the short sides of the resin frame 30A which is of a rectangular shape, border upon the opening portion 32, and are arranged so as to be mutually opposed to one another. It should be understood that, in this embodiment, these regions in the short sides of the resin frames 30 are regions which are present at the sides of the manifolds, while, on the other hand, the regions in the long sides denote regions in which the manifolds are not present. In this embodiment, the sandwiching portions 37A of the resin frame 30A on the cathode side, and the sandwiching portions 37B of the resin frame 30B on the anode side, sandwich the peripheral edge portions $S_1$ and $S_2$ of the MEA 20 in the vertical direction of the MEA 20 (for example, in FIG. 2), and thus hold the MEA 20 fixed. In FIG. 7, there is shown the state in which the peripheral edge portion $S_2$ of the MEA 20 is sandwiched by the sandwiching portions 37A of the resin frame 30A on the cathode side, and the sandwiching portions 37B of the resin frame 30B on the anode side.

It should be understood that, with regard to the resin frame 30B on the anode side, although no plan view thereof is given, just like the resin frame 30A on the cathode side, this resin frame 30B comprises a frame portion, fuel gas manifolds, oxidant gas manifolds, and coolant manifolds on the supply side and the discharge side, and sandwiching portions. Furthermore, to this resin frame 30B on the anode side, there are provided a fuel gas supply path for supplying the fuel gas which is supplied via the fuel gas manifold to the anode of the MEA 20, and a fuel gas discharge path for discharging non-reacted fuel gas or the like which has been supplied to the MEA to the fuel gas manifold on the discharge side.

The separators 40 consist of a pair of separators 40A and 40B, with one separator 40A on the cathode side of the MEA 20 being positioned on the cathode side of the MEA 20, and the other separator 40B on the anode side being positioned on the anode side of the MEA 20.

Now, using FIGS. 1 and 2, an explanation will be given of these separators 40, using the separator 40A on the cathode side as an example. It should be understood that, while as described above FIG. 1 is a plan view of the fuel cell 10 according to this embodiment, it also constitutes a plan view of the separator 40A on the cathode side. In FIG. 2, the separator 40A on the cathode side is disposed on the upper side of the MEA 20. This separator 40A comprises coolant passages 41 for conducting a coolant such as water or the like, on its upper side as seen in FIG. 2 (its front side as seen in FIG. 1). In this embodiment, these coolant passages 41 are a plurality of grooves arranged in parallel along the long side direction of the separator 40A, which is of a rectangular shape. The coolant is supplied to the coolant passages 41 from the supply side coolant manifold 13A, but a coolant supply path 42A is provided between the supply side coolant manifold 13A and the coolant passages 41, for supplying the coolant to the coolant passages. Due to the existence of this coolant supply path 42A, it is possible for the coolant which has been supplied from the supply side coolant manifold 13A to permeate across into the coolant passages 41 which consist of a plurality of grooves. The coolant which has passed through the coolant passages 41 is discharged from the discharge side coolant manifold 13B. A coolant discharge path 42B is provided between the discharge side coolant manifold 13B and the coolant passages 41, and the coolant which has passed through the coolant passages 41 is collected by this coolant discharge path 42B and is discharged to the discharge side coolant manifold 13B. Furthermore, the separator 40A on the cathode side is provided, on its lower side surface in FIG. 2, with an oxidant gas supply passage for supplying oxidant gas to the cathode 28A of the MEA 20. The oxidant gas passes from the supply side oxidant gas manifold 34A along the oxidant gas supply path 36A in the frame portion 31 of the resin frame 30A on the cathode side, and is supplied to the oxidant gas supply passage 44. It should be understood that the non-reacted oxidant gas and so on which has passed along the oxidant gas supply passage 44 then passes along the oxidant gas discharge path 36B of the resin frame 30A, and is discharged to the discharge side oxidant gas manifold 34B.

On the other hand, the separator 40B on the anode side is disposed on the lower side of the MEA 20. This separator 40B on the anode side has the same fundamental structure as the separator 40A on the cathode side. Coolant passages 41 are provided on the lower side in FIG. 2 of the separator 40B for conducting coolant such as water or the like, and a fuel gas supply passage 45 is provided on the upper side surface thereof for supplying fuel gas to the anode of the MEA 20.

The separator 40 is made from an electrically conductive material such as aluminum or stainless steel or the like, and portions thereof are contacted against the MEA 20, and are formed as collector portions 48 for collecting electricity from the MEA 20. Normally such collector portions 48 are provided at a plurality of locations over the MEA 20. In this embodiment of the present invention, convex portions 47A, 47B of the cathode side and anode side separators 40A, 40B contact against the two sides of the MEA, and constitute the collector portions 48. It should be understood that, in this embodiment, along with these convex portions 47 constituting the collector portions 48, they also constitute the coolant passages 41, and the oxidant gas supply passages 44 and the fuel gas supply passages 45.

The fuel cell 10 according to this embodiment, in particular, comprises collector portions 50 at the peripheral edge portions of the MEA; in concrete terms, these collector portions 50 are provided (refer to FIGS. 2 and 3) as being positioned at the peripheral edge portions $S_3$ and $S_4$ of the MEA. These collector portions 50, along with collecting electricity at these peripheral edge portions $S_3$ and $S_4$, also hold the MEA 20 fixed by contacting against the MEA at its front and rear surfaces there. Accordingly, in the MEA 20 of this embodiment of the present invention, the peripheral edge portions $S_1$ and $S_2$ of the MEA 20 is sandwiched by the sandwiching portions 37 of the resin frames 30, so that the MEA 20 is fixed, and moreover its peripheral edge portions $S_3$ and $S_4$ are contacted by the convex portions 47A and 47B of the separators 40A and 40B, whereby the MEA 20 is fixed. Accordingly, it becomes difficult for wrinkling in the MEA 20 to occur.

Now, the theory of electricity generation by the fuel cell 10 according to this embodiment will be explained in simple terms with reference to FIGS. 1, 2, and 5. Fuel gas which is supplied into the fuel cells 10 (the stack thereof) passes through the supply side fuel gas manifold 11A and is supplied into each of the fuel cells 10 (the single cells). This fuel gas passes along the fuel gas supply path (not shown in the figures) in the resin frame 30B (on the anode side) of this fuel cell 10, and furthermore is supplied to the anode 28B of the MEA 20 while passing along the fuel gas supply passages 45 of the separator 40B (on the anode side). It should be understood that, normally, this fuel gas is supplied in a humidified state. On the other hand, the oxidant gas is supplied to each of the fuel cells via the supply side oxidant gas manifold 12A. This oxidant gas passes through the oxidant gas supply path 36A of the resin frame 30A (on the cathode side) of the fuel cell 10, and furthermore is supplied to the cathode 28A of the MEA 20 while passing along the oxidant gas supply passages 44 of the separator 40A (on the cathode side).

When this oxidant gas is supplied to the cathode 28A of the MEA 20, the fuel gas at the anode 28B undergoes the following chemical reaction in the MEA 20. This fuel gas which has been supplied to the anode 28B is divided into protons and electrons. The protons which are thus generated shift within the electrolyte layer 22 from the anode 28B, and arrive at the cathode 28A on the opposite side to the anode 28B. The electrons travel within the separator 40B from its collector portions 48 (the convex portions 47B), and furthermore pass along within the separator 40A" on the cathode side of the next fuel cell 10A in the stack, which is adjacent to this separator 40B. On the other hand, the oxidant gas (the oxygen) which has been supplied to the cathode 28A generates water by coupling to the protons which have shifted within the electrolyte layer 22. Although electrons are required for this coupling of the oxygen with these protons, these electrons are ones which are supplied by the separator 40B' on the anode side of the next fuel cell 10A, which is adjacent to this separator 40A on the cathode side. It is possible to take off electricity from the fuel cell by this series of chemical reactions which generate water.

Since the fuel cell 10 according to this first embodiment comprises the collector portion 47 at the regions (refer to FIG. 3) of the peripheral edge portions $S_3$ and $S_4$ of the MEA 20, accordingly it is possible for the above described chemical reaction also to progress at the regions of the peripheral edge portions $S_3$ and $S_4$.

Figure 8:
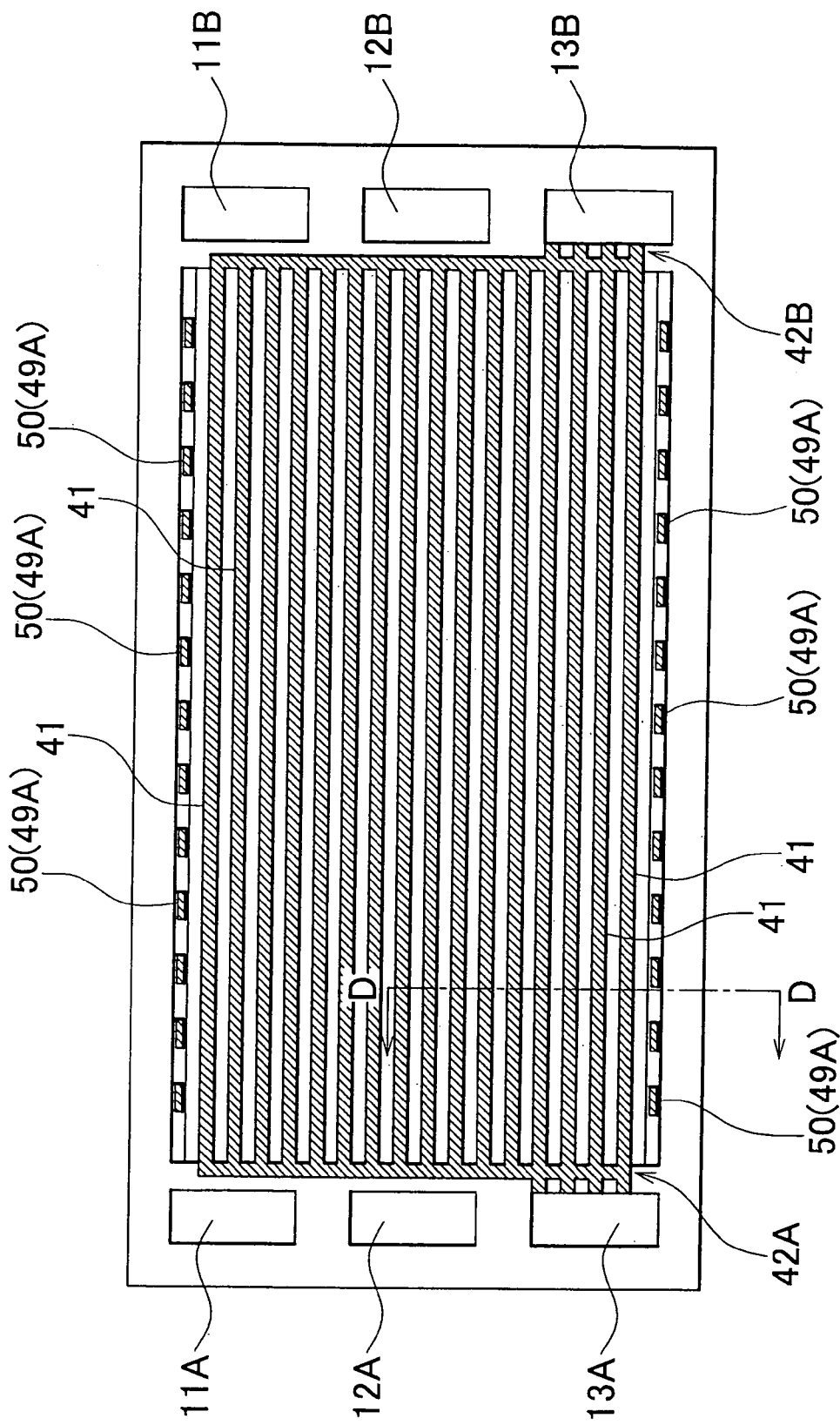
FIG. 8 is a plan view of a fuel cell according to a second embodiment of the present invention.

Next, a second embodiment of the present invention will be explained with reference to FIGS. 8 to 10.

The fuel cell 110 according to this second embodiment has the same fundamental structure as the fuel cell 10 according to the first embodiment described above. For elements which are the same, the same reference symbols are used in the figures for this second embodiment, as in the figures relating to the first embodiment. The principal features in which this fuel cell 110 of the second embodiment differs from the fuel cell 10 of the first embodiment, is the structure of the collector portion which is formed around the peripheral edge portion of the MEA 20. As shown in FIG. 8, with the fuel cell 110 according to this second embodiment, a plurality of individual collector portions 50 are provided at positions upon the peripheral edge portion of the MEA 20.

Figure 9:
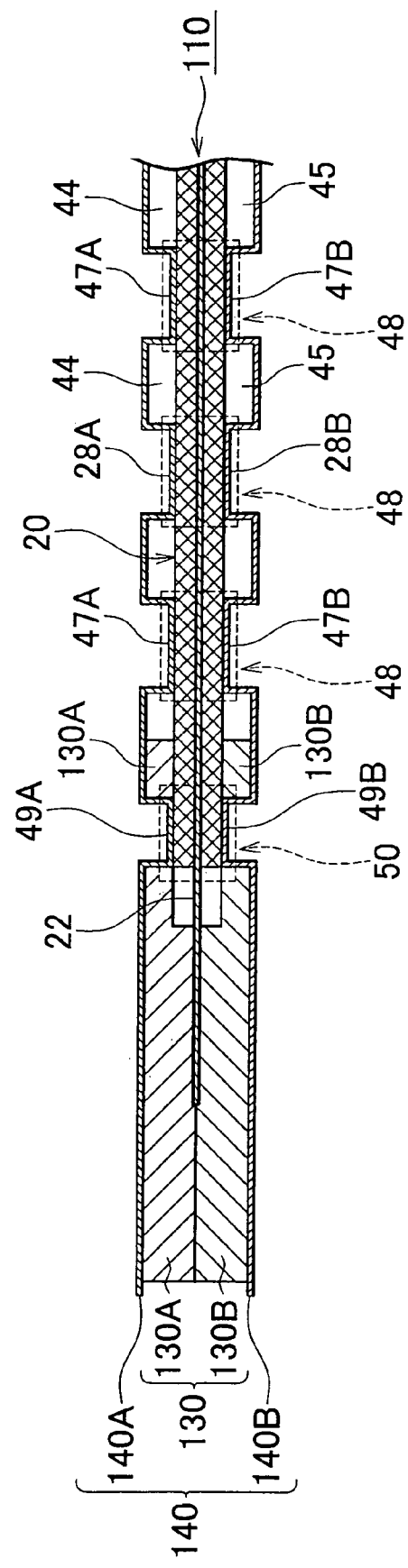
FIG. 9 is a sectional view of a portion of the fuel cell of FIG. 8, taken in a plane shown by the line D-D in that figure.
Figure 10:
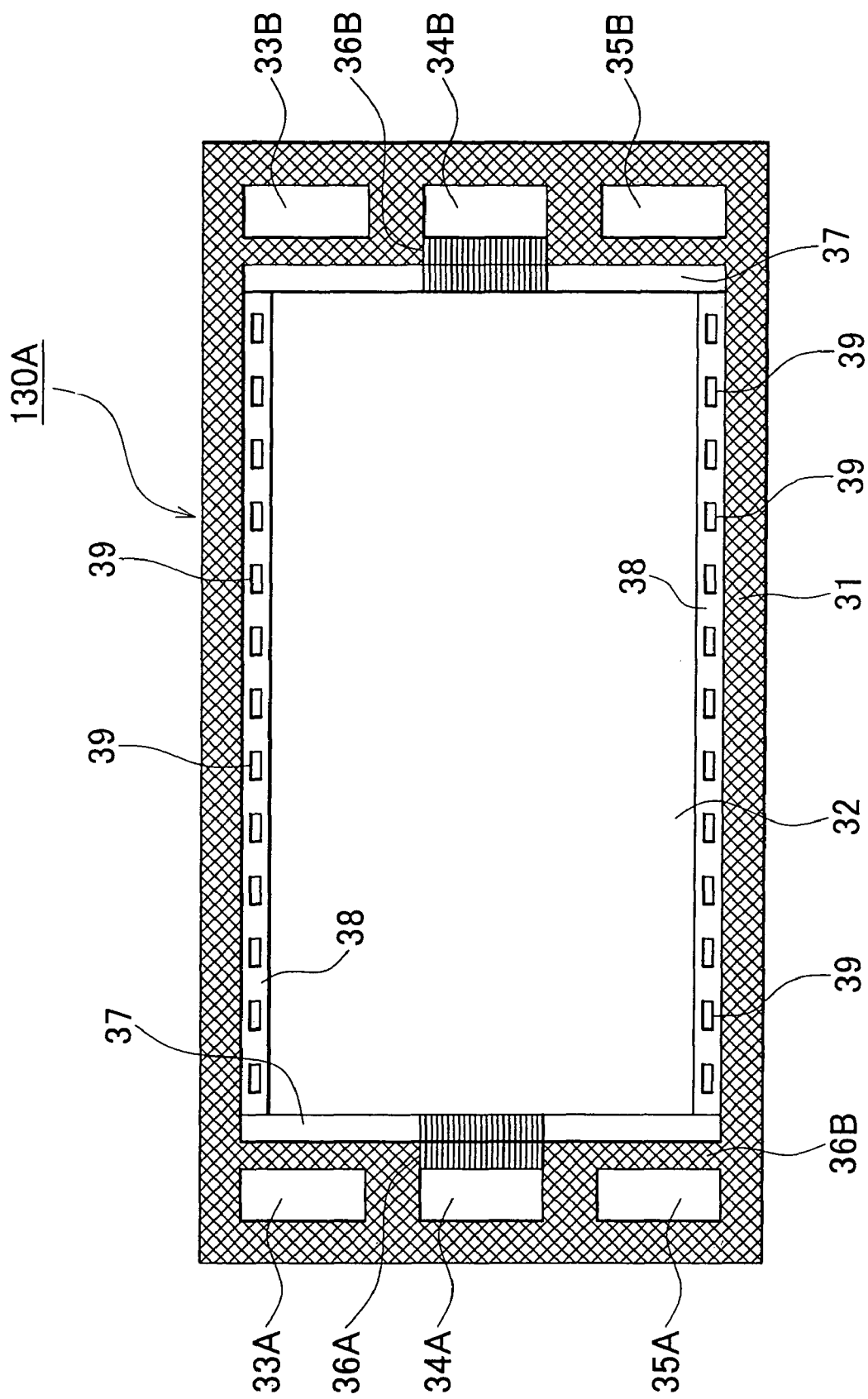
FIG. 10 is a plan view of a resin frame (on the cathode side) according to the second embodiment.

As shown in FIG. 9, the fuel cell 110 of this second embodiment comprises a MEA 20, resin frames 130 (130A, 130B) which are arranged on the front and the rear surface of the MEA 20, and separators 140 (140A, 140B) which are arranged on the front and rear surface of the MEA 20 as it is sandwiched between the resin frames 130. Moreover, in this second embodiment as well, it is supposed that other fuel cells not shown in the figures are arranged above and below the fuel cell 110 which is shown in the figures.

On the two surfaces of the separator 140A on the cathode side, which is positioned above the MEA 20, there are provided a plurality of grooves, of which the upper side grooves define coolant passages 41, and the lower side grooves define oxidant gas supply passages 44. Moreover, on the two surfaces of the separator 140B on the anode side, which is positioned below the MEA 20, there are provided a plurality of grooves, of which the lower side grooves define coolant passages 41, and the upper side grooves define fuel gas supply passages 45. Furthermore, convex portions 47A of the separator on the cathode side and convex portions 47B of the separator on the anode side define collector portions 48 which are contacted against the MEA 20.

Apart from the above described collector portions 48, the fuel cell 110 according to this second embodiment has a plurality of collector portions 50 which are positioned at the peripheral edge portion of the MEA 20. These collector portions 50 are defined by convex electrically collecting portions 49A, 49B which are respectively formed upon the separator 140A on the cathode side and the separator 140B on the anode side being contacted against the MEA 20 from its upper side and its lower side respectively.

Now, the resin frames 130 of this fuel cell 110 according to the second embodiment will be explained. These resin frames 130 are provided as a pair of resin frames 130A and 130B for the cathode side and the anode side respectively, and predetermined locations on the peripheral edge portion of the MEA 20 are sandwiched on their front and rear surfaces by this pair of resin frames 130A, 130B. Since the fundamental structures of these two resin frames 130A and 130B are the same, only the structure of the resin frame 130 which is used as the resin frame 130A on the cathode side will be explained. As shown in FIG. 10, the resin frame 130A on the cathode side according to this second embodiment comprises, as sandwiching portions which sandwich the MEA 20, not only sandwiching portions which are arranged along the short sides of the resin frame 130A, but also sandwiching portions 38 arranged along its long sides, so that, in this aspect, this structure is different from that of the fuel cell 10 according to the first embodiment described above. The MEA 20 according to this second embodiment is identical to the MEA 20 of the first embodiment described above which has been explained with reference to FIG. 3. The regions of the peripheral edge portions $S_1$ and $S_2$ of the MEA 20 sandwiched between the sandwiching portions 37 along the short sides of the resin frames 130, while the regions of the portions $S_3$ and $S_4$ are sandwiched by the sandwiching portions 38 along their long sides. Due to this, the structure ensures that occurrence of wrinkling of the MEA 20 is even more difficult, as compared to the case of the first embodiment described above. As shown in FIG. 10, the sandwiching portions 38 along the long sides of the resin frames 130 are provided with a plurality of hole portions 39, with the above described collector portions 50 are provided in the positions of these hole portions 39. It should be understood that, although the frame 130 which is shown in FIG. 10 is the resin frame 130A on the cathode side, in a similar manner, similar hole portions are also formed in the resin frame 130B on the anode side, which is not shown in the figures.

These collector portions 50 which are provided upon the peripheral edge portions of the MEA 20 as described above are formed in the positions of the hole portions 39 on the sandwiching portions 38 along the long sides of the resin frame 130. As shown in FIG. 9, the convex electrically collecting portions 49A on the separator 140A on the cathode side and the convex electrically collecting portions 49B on the separator 140B on the anode side respectively fit into the hole portions 39 of the resin frame 130A on the cathode side and the hole portions of the resin frame 130B on the anode side, and moreover contact against the MEA 20, thus forming the collector portions 50 on the peripheral edge portion of the MEA 20. It should be understood that although, in this second embodiment, the collector portions 50 are provided in the regions $S_3$ and $S_4$ along the long sides of the peripheral edge portion of the MEA 20, according to requirements, it would also be acceptable to arrange to provide such collector portions in the regions S1 and S2 along the short sides of the peripheral edge portion of the MEA 20 as well.

Figure 11:
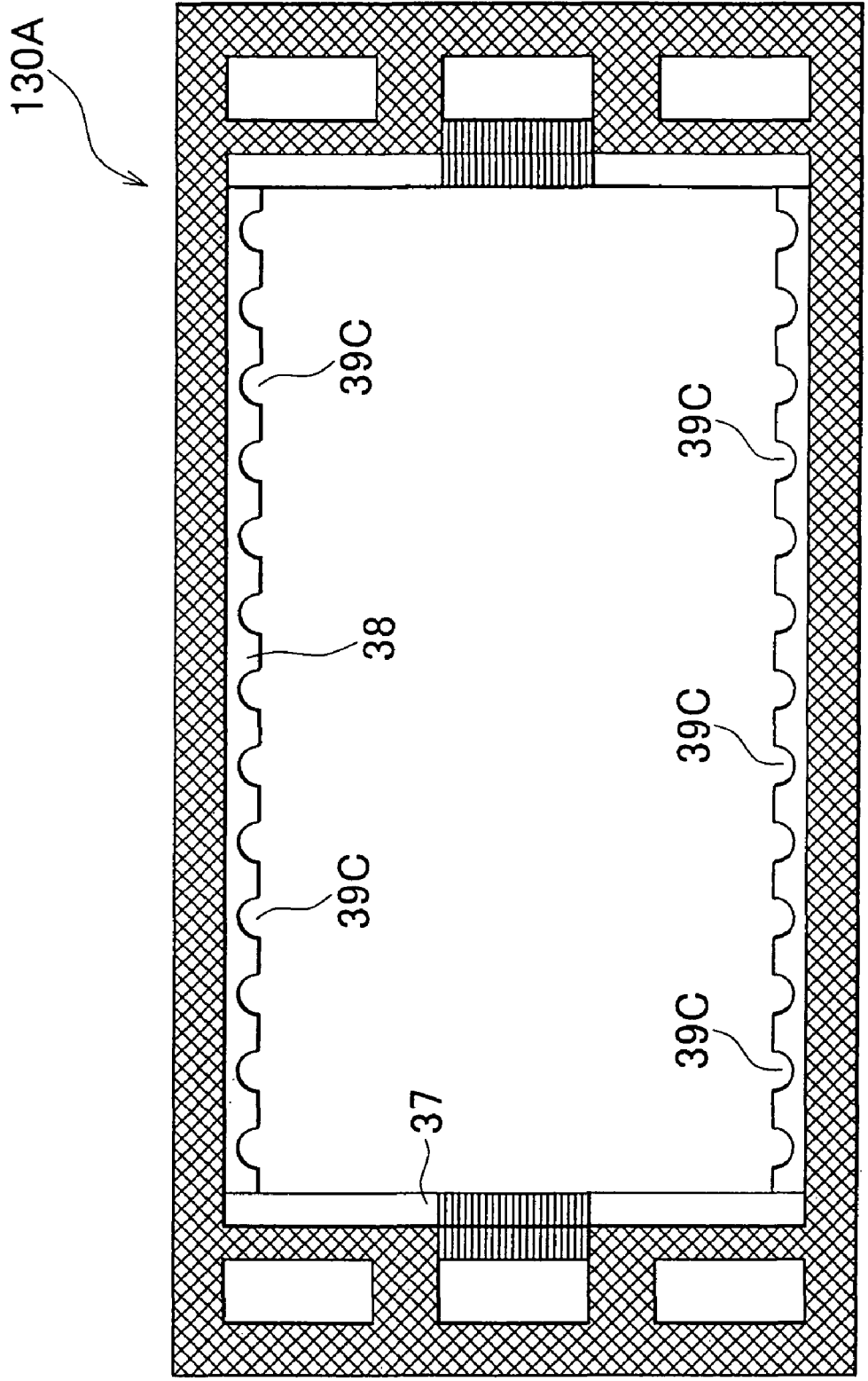
FIG. 11 is a plan view of a resin frame (on the cathode side) according to another embodiment.

Although, in the above described second embodiment, the hole portions 39 are provided in the sandwich portions 38 of the resin frames 130, it would also be acceptable, in other embodiments, instead of such hole portions 39, to provide cutaway portions 39C (refer to FIG. 11). In this case, the collector portions would be constituted by convex electrically collecting portions which have shapes corresponding to the shapes of the cutaway portions 39C. It should be understood that the convex electrically collecting portions described in the various embodiments explained above can be considered as the "convex portions"in the Claims.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the spirit and scope of the invention.

What is claimed is:

1. A fuel cell, comprising:
a membrane electrode assembly which comprises electrodes being formed on the surface of an electrolyte layer, the membrane electrode assembly having four peripheral edge portions including a first pair of short opposing peripheral edge portions and a second pair of long opposing peripheral edge portions;
insulating frames which are disposed at the front and the rear surface of the membrane electrode assembly, and which fix the membrane electrode assembly by sandwiching only the first pair of short opposing peripheral edge portions of the membrane electrode assembly, thereby leaving at least a second the second pair of long peripheral edge portions not sandwiched by the frames; and
electrically conductive separators which are disposed at the front and the rear surface of the membrane electrode assembly, which are formed at the second pair of long opposing peripheral edge portions of the membrane electrode assembly not sandwiched by the insulating frames, and which contact against the membrane electrode assembly and define collector portions that collect electricity from the membrane electrode assembly.

2. A fuel cell as claimed in claim 1, wherein the electrically conductive separators have convex portions, and the collector portions at the four peripheral edge portions of said layered electrode assembly are constituted by the convex portions being contacted against the membrane electrode assembly.

3. A fuel cell as claimed in claim 2, wherein the convex portions, along with defining the collector portions, define coolant passages which conduct a coolant, oxidant gas supply passages which supply an oxidant gas, and fuel gas supply passages which supply a fuel gas.

4. A fuel cell as claimed in claim 1, wherein the insulating frames are made from a resin.

5. A fuel cell as claimed in claim 1, wherein the electrically conductive separators are made from a metal.

6. A frame which is used in the fuel cell as claimed in claim 1, wherein hole portions are pierced so as to admit the collector portions of said electrically conductive separators through the sandwiching portion.

7. A frame which is used in the fuel cell as claimed in claim 1, wherein cutaway portions are formed so as to admit the collector portions of the electrically conductive separators through the sandwiching portion.

8. A fuel cell, comprising:
a membrane electrode assembly which comprises electrodes being formed on the surface of an electrolyte layer, the membrane electrode assembly having four peripheral edge portions including a first pair of short opposing peripheral edge portions and a second pair of long opposing peripheral edge portions;
insulating frames which are disposed at the front and the rear surface of the membrane electrode assembly, and which fix the membrane electrode assembly by sandwiching only a first portion of a peripheral edge portion of the electrolyte layer, thereby leaving at least the second pair of long opposing peripheral edge portions not sandwiched by the frames; and
electrically conductive separators which are disposed at the front and the rear surface of the membrane electrode assembly, which are formed at the second pair of long opposing peripheral edge portions of the electrodes which are not sandwiched by the insulating frames, the separators also being in contact against the electrodes and defining collector portions that collect electricity from the membrane electrode assembly at the second pair of opposing peripheral edge portions of the electrodes.

* * * * *

UNITED STATES PATENT AND TRADEMARK OFFICE
CERTIFICATE OF CORRECTION

| | | |
|---|---|---|
| PATENT NO. | : 7,906,247 B2 | |
| APPLICATION NO. | : 11/510611 | |
| DATED | : March 15, 2011 | |
| INVENTOR(S) | : Yoshitaka Kino | |

It is certified that error appears in the above-identified patent and that said Letters Patent is hereby corrected as shown below:

IN THE CLAIMS:

| Column | Line | Claim 1 |
|---|---|---|
| 9 | 14 | After "at least" delete "a second". |
| 9 | 15 | Before "peripheral" insert --opposing--. |

Signed and Sealed this

Sixteenth Day of August, 2011

David J. Kappos
*Director of the United States Patent and Trademark Office*